US009482738B2

(12) United States Patent
Ostergaard et al.

(10) Patent No.: US 9,482,738 B2
(45) Date of Patent: Nov. 1, 2016

(54) METHOD, DEVICE AND SYSTEM FOR DETERMINING TOPOLOGY OF A WIRELESS COMMUNICATION NETWORK

(75) Inventors: Paul Frederick Norwood Ostergaard, Perth (AU); David Alexander Wilson, Perth (AU)

(73) Assignee: Norwood Systems Pty Ltd, Nedlands (AU)

(*) Notice: Subject to any disclaimer, the term of this patent is extended or adjusted under 35 U.S.C. 154(b) by 0 days.

(21) Appl. No.: 14/232,696

(22) PCT Filed: Jul. 13, 2012

(86) PCT No.: PCT/AU2012/000848
§ 371 (c)(1),
(2), (4) Date: Sep. 18, 2014

(87) PCT Pub. No.: WO2013/006922
PCT Pub. Date: Jan. 17, 2013

(65) Prior Publication Data
US 2015/0024774 A1   Jan. 22, 2015

(30) Foreign Application Priority Data
Jul. 14, 2011   (AU) ................................ 2011902807

(51) Int. Cl.
*H04W 24/00*    (2009.01)
*G01S 5/02*     (2010.01)
(Continued)

(52) U.S. Cl.
CPC ............. *G01S 5/0242* (2013.01); *H04L 41/12* (2013.01); *H04W 40/246* (2013.01); *H04L 41/0213* (2013.01)

(58) Field of Classification Search
CPC ...... G01S 11/06; G01S 5/0242; H04L 41/12; H04L 41/0213; H04W 40/246
USPC ........................................... 455/456.1, 456.3
See application file for complete search history.

(56) References Cited

U.S. PATENT DOCUMENTS 5,475,866 A * 12/1995 Ruthenberg .......... H04W 84/08
                                                    455/454
5,802,473 A    9/1998 Rutledge et al.
(Continued)

FOREIGN PATENT DOCUMENTS

| CA | 2628121 | 10/2009 |
| WO | 02080597 | 10/2002 |
| WO | WO 02080597 A1 * 10/2002 | ........... G01S 5/0289 |

OTHER PUBLICATIONS

AU2011902807, International-Type Search Report, issued May 8, 2012.
(Continued)

*Primary Examiner* — Sam K Ahn
*Assistant Examiner* — Fabricio R Murillo Garcia
(74) *Attorney, Agent, or Firm* — Suzannah K. Sundby, Esq.; Canady + Lortz LLP

(57) ABSTRACT

A method for determining a topology of a wireless communication network (14), the method comprising: receiving a plurality of signal strength data respectively measured at a plurality of fixed stations (12) in the network each with respect to its neighbouring fixed stations; receiving a sensor data measured at a mobile station 16 operable to communicate with the network; and determining positions of the plurality of fixed stations based on the signal strength data measured at the plurality of fixed stations and the sensor data measured at the mobile station.

44 Claims, 3 Drawing Sheets

(51) Int. Cl.
*H04L 12/24* (2006.01)
*H04W 40/24* (2009.01)

(56) References Cited

U.S. PATENT DOCUMENTS

| | | | |
|---|---|---|---|
| 6,754,488 B1 | 6/2004 | Won et al. | |
| 2005/0227724 A1 | 10/2005 | Tsai | |
| 2006/0217131 A1 | 9/2006 | Alizadeh-Shabdiz et al. | |
| 2006/0227745 A1* | 10/2006 | Olvera-Hernandez | H04W 36/32 370/331 |
| 2008/0233938 A1* | 9/2008 | Bradley | H04W 84/005 455/418 |
| 2009/0005052 A1 | 1/2009 | Abusch-Magder et al. | |
| 2009/0316585 A1* | 12/2009 | Srinivasan | H04W 24/02 370/241 |
| 2011/0069627 A1* | 3/2011 | Sridhara | G01S 11/06 370/252 |

OTHER PUBLICATIONS

PCT/AU2012/000848, International Search Report, issued Jan. 17, 2013.

* cited by examiner

Observed

Supplied
by user

Hidden

METHOD, DEVICE AND SYSTEM FOR DETERMINING TOPOLOGY OF A WIRELESS COMMUNICATION NETWORK

RELATED APPLICATIONS

This application is a national phase filing under 35 U.S.C. 371 of International Application No. PCT/AU2012/000848, filed Jul. 13, 2012, which claims the benefit of and priority to Australian Provisional Patent Application No. 2011902807, filed Jul. 14, 2011, all of these applications are incorporated herein by reference in their entireties.

TECHNICAL FIELD

The present invention generally relates to a method and system for determining topology of a wireless communication network, and in particular, access point topology (i.e., base station or fixed station topology) in a multi-cell wireless communication network.

BACKGROUND ART

Each document, reference, patent application or patent cited in this text is expressly incorporated herein in their entirety by reference, which means that it should be read and considered by the reader as part of this text. That the document, reference, patent application, or patent cited in this text is not repeated in this text is merely for reasons of conciseness.

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

In a multi-cell wireless network, there are multiple network access points, which may be base stations or fixed stations, with which devices, such as mobile devices or mobile stations, may establish a connection in order to access the wireless network. For example, the wireless communication technology used may be Wi-Fi. The mobile device may establish a connection with one of the access points to access the wireless network. However, as the mobile device moves relative to the serving access point, the connection with the serving access point may be lost or dropped due to, for example, insufficient signal strength to support the connection. Therefore, in such a wireless network, when the connection with the serving access point becomes unsatisfactory or less desirable, there exists a handover or handoff procedure for triggering the mobile device to establish a new connection with a target access point providing better signal strength, in an attempt to maintain continuous communication with the wireless network.

In a multi-cell wireless network, geospatial data relating to the positions of the access points (or access point topology) in the wireless network may be of benefit when deciding to and/or implementing an action such as, for example, making a handover decision and/or when executing a handover operation. The geospatial data is also referred to as geographic information system ("GIS") information and is typically stored in a network management system.

Conventionally, a network operator manually enters the geospatial data in the network management system for the wireless network. This manual data entry is often time-consuming and expensive as well as being error-prone.

Geospatial data is also typically required when installing a Fixed Mobile Convergence ("FMC") system or deploying FMC solutions to existing communication systems. FMC is a term used in the art for the integration of fixed and mobile networks to provide a single communication network foundation. For example, in an enterprise environment, FMC solutions can be applied to provide users with seamless services using a combination of fixed and mobile networks.

However, due to the time and costs involved with manual configurations when deploying FMC solutions (such as the above-described manual data entry of geospatial data in the network management system), there exist adoption barriers which may cause enterprises to either delay or decide against implementing FMC solutions.

International Patent Application No. PCT/AU02/00381, Publication No. WO 02/080597, filed 27 Mar. 2002 discloses a method for determining base station topology in a wireless network. However, the present inventors have identified a number of deficiencies associated with the method described in PCT/AU02/00381 for determining base station topology. For example, the method disclosed in PCT/AU02/00381 fails to account for propagation losses in the signal strength detected by an access point due to blocking objects, such as walls, in the path. As another example, the base station topology is not determined with respect to an absolute reference frame (e.g., an earth reference coordinate frame). As a result, the base station topology obtained may not accurately represent or correspond with the actual position of the base stations since it cannot be orientated and/or scaled in space. To at least some extent, the present invention builds on the invention described in PCT/AU02/00381. Therefore, PCT/AU02/00381 is expressly incorporated herein in it's entirely by reference as if fully set forth herein.

It is against this background that the present invention has been developed.

SUMMARY OF INVENTION

The present invention seeks to overcome, or at least ameliorate, one or more of the deficiencies of the prior art mentioned above, or to provide the consumer with a useful or commercial choice.

According to a first broad aspect of the present invention, there is provided a method for determining a topology of a wireless communication network, the method comprising:

receiving a plurality of signal strength data respectively measured at a plurality of fixed stations in the network each with respect to its neighbouring fixed stations;

receiving sensor data measured at a mobile station operable to communicate with the network, wherein the sensor data comprises signal strength data measured at the mobile station and at least one of an acceleration data, an orientation data, a direction data, and a mobile station position data; and determining the topology of the plurality of fixed stations based on the signal strength data measured at the plurality of fixed stations and the sensor data measured at the mobile station;

wherein determining the topology comprises estimating at least one of a distance and a direction, using the at least one of acceleration data, orientation data, direction data, and mobile station position data, between two or more locations of a mobile station at which signal strength data has been measured, to reference positions of the fixed stations with respect to an absolute reference frame.

Preferably, the topology comprises at least one of a physical arrangement, a two dimensional (2D) topology, a three dimensional (3D) topology, and a logical topology. The physical arrangement may comprise data of, associated with, indicating or specifying a position or location of one or more fixed stations of the plurality of fixed stations and preferably the mobile station. The data may comprise an estimate of distance between at least two of the fixed stations, and preferably between the mobile station and at least one of the fixed stations.

Preferably a distance estimate of a fixed station with respect to a neighbouring fixed station is determined based on the following formula:

$$\text{Distance Estimate}(i,j) = f(\text{SignalStrength}(i,j)),$$

where SignalStrength(i,j) represents the signal strength or power level received by fixed station (i) from fixed station (j); and f is a function for correcting the signal strength data to compensate for at least one source of interference or obstruction and then applying an inverse path loss formula to derive the distance estimate.

Preferably, the method comprises storing the distance estimate(s) in a storage means. The storage means may comprise a similarity or diagonal matrix or database, and preferably a Torgerson-SMACOF similarity matrix.

Preferably, determining the topology comprises processing the distance estimates using an algorithm suitable for determining or estimating the positions of the fixed stations based on distance estimates. The processing may comprise using a Torgerson-SMACOF algorithm.

Preferably, the processing comprises using a constrained Torgerson-SMACOF algorithm to estimate the positions of the fixed stations in the network and arrange the estimated positions of the fixed stations into multiple floor levels or segments of a physical environment of the network and into the respective estimated positions on each floor level or segment.

Preferably, the method comprises filtering the estimated positions.

Preferably, the method comprises automatically determining the topology.

Preferably, the method comprises measuring the signal strength data in more than one frequency or frequency bands, and preferably in two frequencies or frequency bands.

Preferably, the method comprises correcting received signal strength data to compensate for at least one source of interference or obstruction.

Preferably, the sensor data relates to a state of the mobile station or a state of the environment surrounding the mobile station.

Preferably, the state of the mobile station comprises at least one of a position, a velocity, and a speed of the mobile station.

Preferably, the state of the environment surrounding the mobile station comprises at least one and more preferably a plurality of signal strengths sensed or measured.

Preferably, the sensor data comprises at least one of a signal strength data measured at the mobile station with respect to at least one neighbouring fixed station of the plurality of fixed stations, an acceleration data, an orientation data, a direction data, and a mobile station position data.

Preferably, determining the topology comprises using the mobile station position data to reference positions of the fixed stations with respect to an absolute reference frame.

Preferably, the signal strength data comprises Radio Signal Strength Indication ("RSSI") data.

Preferably, the RSSI is generated by a radio signal strength sensor.

Preferably, the method comprises requesting the measurement of the signal strength data.

Preferably, the method comprises re-determining the topology of the network upon the occurrence of one or more events.

According to a second broad aspect of the present invention, there is provided a device for determining a topology of a wireless communication network, the device comprising a processor and a storage medium, the storage medium having a computer program comprising executable instructions stored thereon, whereby the processor is operable, under control of the computer program, to:

receive a plurality of signal strength data respectively measured at a plurality of fixed stations in the network each with respect to its neighbouring fixed stations;

receive sensor data measured at a mobile station operable to communicate with the network, wherein the sensor data comprises signal strength data measured at the mobile station and at least one of an acceleration data, an orientation data, a direction data, and a mobile station position data;

determine the topology of the plurality of fixed stations based on the signal strength data measured at the plurality of fixed stations and the sensor data measured at the mobile station; and determine the topology by estimating at least one of a distance and a direction, using the at least one of acceleration data, orientation data, direction data, and mobile station position data, between two or more locations of a mobile station at which signal strength data has been measured, to reference positions of the fixed stations with respect to an absolute reference frame.

Preferably, the topology comprises at least one of a physical arrangement, a two dimensional (2D) topology, a three dimensional (3D) topology, and a logical topology. The physical arrangement may comprise data of, associated with, indicating or specifying a position or location of one or more fixed stations of the plurality of fixed stations and preferably the mobile station. The data may comprise an estimate of distance between at least two of the fixed stations, and preferably between the mobile station and at least one of the fixed stations.

Preferably, the processor is operable, under control of the computer program, to determine the distance estimate of a fixed station with respect to a neighbouring fixed station based on the following formula:

$$\text{Distance Estimate}(i,j) = f(\text{SignalStrength}(i,j)),$$

where SignalStrength(i,j) represents the signal strength or power level received by fixed station (i) from fixed station (j); and f is a function for correcting the signal strength data to compensate for at least one source of interference or obstruction and then applying an inverse path loss formula to derive the distance estimate.

Preferably, the processor is operable, under control of the computer program, to store the distance estimate(s) in a storage means.

Preferably, the storage means comprises at least one of a similarity matrix, a diagonal matrix, a database, and a pre-SMACOF similarity matrix.

Preferably, the processor is operable, under control of the computer program, to determine the topology by processing the distance estimates using an algorithm suitable for determining or estimating the positions of the fixed stations based on distance estimates.

Preferably, the processing comprises using a Torgerson-SMACOF algorithm and/or using a constrained Torgerson-SMACOF algorithm to estimate the positions of the fixed stations in the network and arrange the estimated positions of the fixed stations into multiple floor levels or segments of a physical environment of the network and into the respective estimated positions on each floor level or segment.

Preferably, the processor is operable, under control of the computer program, to filter the estimated positions.

Preferably, the processor is operable, under control of the computer program, to automatically determine the topology.

Preferably, the processor is operable, under control of the computer program, to receive signal strength data measured in more than one frequency or frequency bands.

Preferably, the signal strength data is measured in two frequencies or frequency bands.

Preferably, the processor is operable, under control of the computer program, to correct received signal strength data to compensate for at least one source of interference or obstruction.

Preferably, the sensor data relates to a state of the mobile station or a state of the environment surrounding the mobile station.

Preferably, the state of the mobile station comprises at least one of a position, a velocity, and a speed of the mobile station.

Preferably, the state of the environment surrounding the mobile station comprises at least one and more preferably a plurality of signal strengths sensed or measured.

Preferably, the sensor data comprises at least one of a signal strength data measured at the mobile station with respect to at least one neighbouring fixed station of the plurality of fixed stations, an acceleration data, an orientation data, a direction data, and a mobile station position data.

Preferably, the processor is operable, under control of the computer program, to determine the topology using the mobile station position data to reference positions of the fixed stations with respect to an absolute reference frame.

Preferably, the signal strength data comprises Radio Signal Strength Indication ("RSSI") data.

Preferably, the RSSI is generated by a radio signal strength sensor.

Preferably, the processor is operable, under control of the computer program, to request the measurement of the signal strength data.

Preferably, the processor is operable, under control of the computer program, to re-determine the topology of the network upon the occurrence of one or more events.

According to a third broad aspect of the present invention, there is provided a system for determining a topology of a wireless communication network, the system comprising:

the device according to the second broad aspect of the present invention as hereinbefore described;

a plurality of fixed stations; and one or more mobile stations.

According to a fourth broad aspect of the present invention, there is provided a computer program product for determining a topology of a wireless communication network, the computer program product comprising computer executable instructions adapted to cause, when executed by a processing circuit, the processing circuit to perform the method according to the first broad aspect of the present invention as hereinbefore described.

Preferably, the computer program product comprises a computer-readable medium having stored thereon the computer executable instructions.

According to a fifth broad aspect of the present invention, there is provided a computer program programmed to control a processing circuit to perform the method according to the first broad aspect of the present invention as hereinbefore described when executed by the processing circuit.

According to a sixth broad aspect of the present invention, there is provided a computer-readable storage medium on which is stored instructions that, when executed by a computing means, causes the computing means to carry out the method according to the first broad aspect of the present invention as hereinbefore described.

According to a seventh broad aspect of the present invention, there is provided a computing means programmed to carry out the method according to the first broad aspect of the present invention as hereinbefore described.

According to an eighth broad aspect of the present invention, there is provided a data signal including at least one instruction being capable of being received and interpreted by a computing system, wherein the instruction implements the method according to the first broad aspect of the present invention as hereinbefore described.

BRIEF DESCRIPTION OF THE DRAWINGS

In order that the invention may be more fully understood and put into practice, preferred embodiments thereof will now be described with reference to the accompanying drawings, in which.

DESCRIPTION OF EMBODIMENTS

Figure 1:
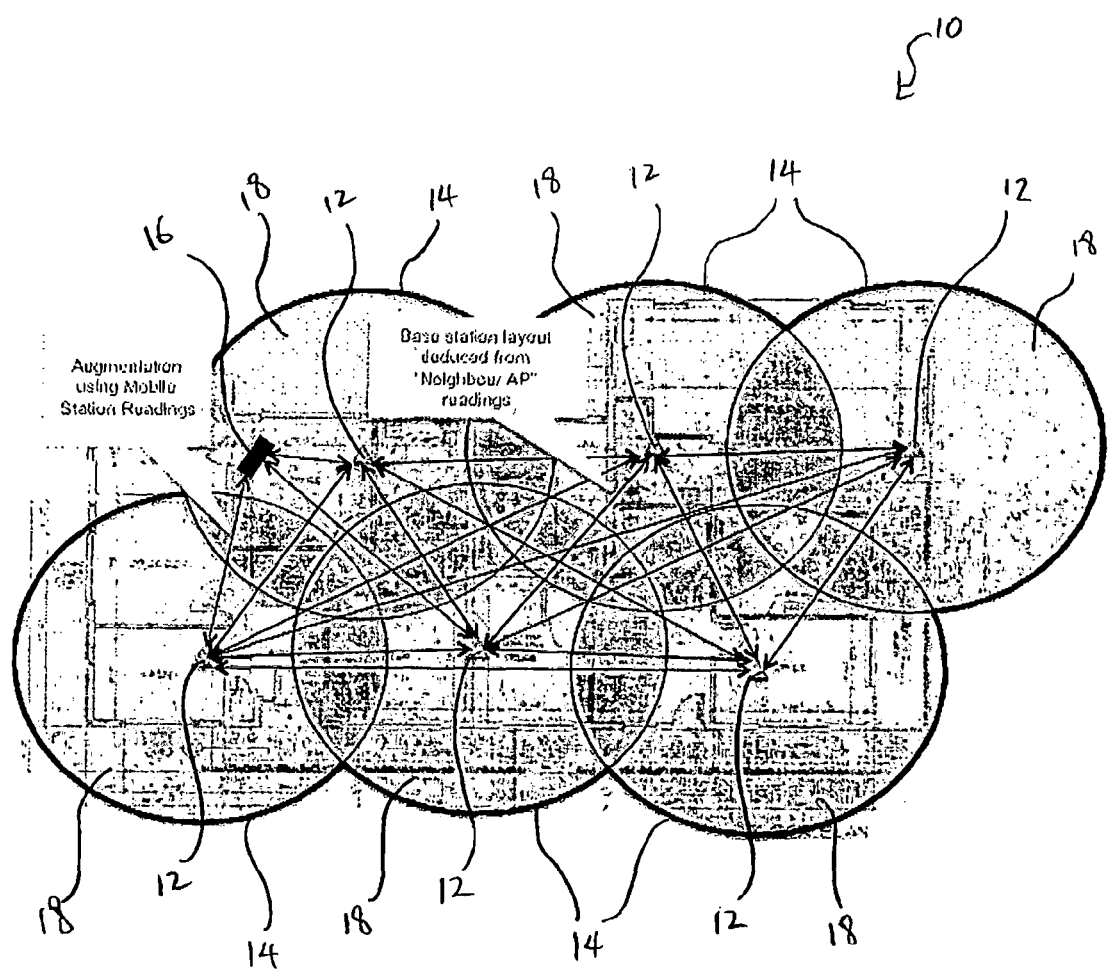
FIG. 1 depicts a schematic illustration of a multi-cell wireless communication network according to an embodiment of the present invention.

In the drawings, like features have been referenced with like reference numbers.

FIG. 1 depicts an exemplary communication system 10 according to an embodiment of the present invention for an enterprise environment. Although the present invention will be described with particular reference to an enterprise environment, it should be appreciated that the invention can also be applied to other types of environment, including indoor and outdoor environments, such as a home or public environment.

The communication system 10 comprises a number of access points 12 which are base stations or fixed stations for a multi-cell wireless communication network or fixed network 14. The wireless network 14 provides wireless connectivity, such as Wi-Fi or hotspots, to one or more devices based on Wireless Local Area Network ("WLAN") technology. Although the present invention will be described with particular reference to WLAN, it should be appreciated that the wireless network 14 is not limited to WLAN and can include any type of wireless communication network, including, for example, networks such as a Wide Area Network ("WAN") or a Metropolitan area network ("MAN"). In FIG. 1, by way of example and not limitation, six access points 12 are illustrated forming the wireless network 14. However, it should be appreciated that the wireless network 14 may comprise any number of access points as required depending on various factors such as the area of coverage required.

One or more mobile stations, which may also be referred to as mobile devices 16 may be wirelessly connected to the wireless network 14 via one of the access points 12. In the embodiment, the mobile station or mobile device 16 is a wireless communication enabled device. Preferably, the mobile device 16 has dual-mode functionality capable of communicating with the fixed network 14 and a mobile network (not shown). The mobile network can be any type of communication network. Such a network may be as provided by a telephone operator or company, including, for example, a Global System for Mobile ("GSM") network, a Code Division Multiple Access ("CDMA") network, a Long Term Evolution ("LTE") network or a WiMAX network.

By way of example and without limitation, the mobile device 16 can be a smartphone such as that marketed under the trade mark iPhone® by Apple Inc. or BlackBerry® by Research In Motion Ltd. As another example, the mobile device 16 can be a portable computing device such as a laptop computer, a notebook computer or a tablet computer such as that marketed under the trade mark iPad® or iPod® Touch by Apple Inc. or Galaxy Tab® by Samsung.

The access point 12 is operable to transmit and receive signals for communication with the mobile device 16. The mobile device 16 is operable to establish a connection with one of the access points 12 as a gateway to gain access to a wider network. By way of example and without limitation, the wider network can be the World Wide Web ("WWW") and/or the Public Switched Telephone Network ("PSTN") (not shown). The access points 12 may be interconnected using wired or wireless technology such as wired or wireless Ethernet. Each access point 12 is operable to provide a characteristic amount of individual or corresponding network coverage (or cell) 18 in the vicinity thereof for the wireless network 14 as depicted in FIG. 1. It should be appreciated that the network coverage provided by each access point 12 will depend on the type or manufacture of the access point. For example, an 802.11n access point is estimated to be capable of providing an indoor range of about 30 m to 50 m.

In order for the mobile device 16 to communicate with the wireless network 14, the mobile device 16 needs to be located within the coverage of one of the cells 18 in order for the mobile device 16 to establish a connection with the corresponding access point 12 having sufficient signal strength. As a user moves from one cell to another cell, a handover of the mobile device's 16 connection from one access point (which may be referred to as a "serving access point") 12 to another access point (which may be referred to as a "target access point") 12 occurs to ensure a seamless connectivity with the wireless network 14.

As discussed in the background to the present invention, when making a handover decision and/or when executing a handover operation from a serving access point 12 to a target access point 12 in a wireless network 14, geospatial data relating to the locations of the access points 12 (or the physical arrangement of the access point topology) in the wireless network 14 is of benefit. For example, the geospatial data and coverage data relating to the access points 12 can together constitute or comprise an indoor wireless (e.g., Wi-Fi) coverage footprint. Accordingly, as the mobile device 16 travels through the wireless network 14, carried by a user whilst on a call for example, locations of the access points 12 relative to the current location of the mobile device 16 and the instantaneous velocity of the mobile station 16 are used in making a handover decision. Therefore, a handover decision can reliably be made when geospatial data relating to the locations of the access points 12 is available. A system and method for implementing an action such as making a handover decision in a wireless network have already been described in detail by the Applicant in Australian Patent Application No. 2011901585 filed 29 Apr. 2011, and International Patent Application No. PCT/AU2012/000438 filed 27 Apr. 2012 claiming priority therefrom, the disclosures of which are expressly incorporated herein in their entirety by reference, which means that they should be read and considered by the reader as part of this text and are not repeated in this text merely for reasons of conciseness.

The geospatial data may also be referred to as geographic information system ("GIS") information and is typically stored in a network management system. Conventionally, the network operator manually enters the geospatial data in the network management system for the wireless network 14. This manual data entry is often time-consuming and expensive as well as being error-prone.

According to an embodiment of the present invention, there is provided a method, a device and a system 30 for determining or generating a topology of a wireless communication network. Preferably, the method, device and system are provided for automatically determining the physical arrangement of the access point topology, including the positions or locations of the base stations or fixed stations topology of a multi-cell wireless communication network. In embodiments of the invention, the topology may comprise at least one of a physical arrangement, a two dimensional (2D) topology, a three dimensional (3D) topology, and a logical topology. In an embodiment, there is provided a computer program (or software) comprising executable instructions adapted to cause, when executed by a processing circuit, the processing circuit to perform the method for automatically determining access point topology of the wireless network 14.

The method, device and system 30 according to the embodiment minimise or eliminate the need to manually determine and enter the geospatial data in a network management system. As a result of this automation, the time and costs associated with installing or configuring the geospatial database in a network management system required for various purposes, including making decisions and implementing or executing actions such as handover operations, can be reduced, whilst the reliability of such installation or configuration can be improved.

Figure 2:
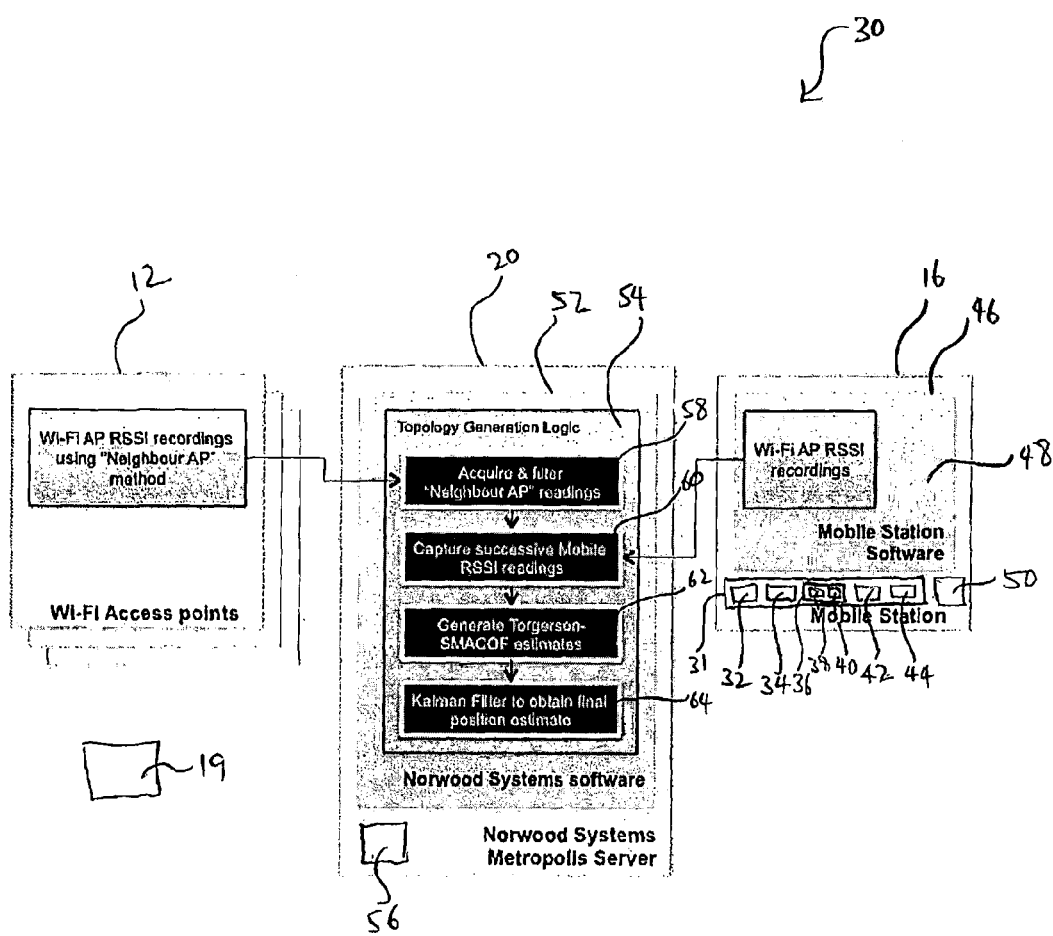
FIG. 2 depicts a schematic block diagram of a system for determining a topology of the wireless network depicted in FIG. 1.

FIG. 2 depicts a schematic block diagram of the system 30 for automatically determining the access point topology of the wireless network 14 according to an embodiment of the present invention. The system 30 comprises a device (or topology generating device) 20 operable for receiving data or information from one or more access points 12 and one or more mobile devices 16, and operable for determining or generating the access point topology of the wireless network 14 based on the received data.

Components and operations of the system 30 according to the embodiment of FIG. 2 will now be described in detail below.

Network Management System 19

In an embodiment of the present invention, the communication system 10 comprises a network management system 19 for managing and monitoring stations and devices, including access points 12, attached to the wireless network 14 under control of a management protocol therein. By way of example and without limitation, the management protocol can be a Simple Network Management Protocol ("SNMP").

The interconnections between the network management system 19 and other components of the communication system 10, such as the access points 12 are not shown in the figures as this is known to the person skilled in the art and need not be described herein or illustrated in the figures Access Point 12

As described hereinbefore, the communication system 10 comprises a number of access points 12 which are base stations or fixed stations for the wireless network 14. One or more mobile stations or devices 16 may be wirelessly connected to the wireless network 14 via one of the access points 12 as a gateway to gain access to the wider network. Accessing the wider network via an access point of a wireless network is well known to persons skilled in the art and need not be described in any further detail herein except as is relevant to the present invention.

The access point 12 is operable to detect or measure a signal strength at the access point 12 with respect to neighbouring access point(s) 12 upon receiving an instruction or a request, and to generate one or more signal strength indicators (one signal strength indicator for each neighbouring access point 12 in the embodiment). In embodiments of the invention, the access point 12 is operable to perform such action automatically. Preferably, the signal strength indicator is in the form of Radio Signal Strength Indication ("RSSI") data. In the embodiment where the communication system 10 comprises a network management system 19, the network management system 19 issues such a request to the access points 12 in the wireless network under the control of the SNMP. Such a request can be supported by a variety of commercially available access points, such as those manufactured by Cisco Systems, Inc. or Hewlett-Packard Company ("HP").

For example, as illustrated in FIG. 1, a network of signal strength data or readings at an access point 12 with respect to neighbouring access points 12 is shown for each access point 12 in the wireless network 14.

Once the signal strength data with respect to neighbouring access points 12 is obtained, the access point 12 is operable to transmit the signal strength data to the topology generation device 20 to be used or processed in determining the network topology, comprising a physical arrangement including data or information of, associated with, indicating or specifying the positions or locations of one or more of the access points 12 in the wireless network 12. The signal strength data obtained and transmitted by the access point 12 can hereinafter be used, or referred to, interchangeably as "access point signal strength data".

In a preferred form of the invention, the system 30 is operable to measure the signal strength data in more than one frequency or frequency bands or ranges, and preferably in two frequencies or frequency bands. In an embodiment, the access point 12 has a dual band capability operable to measure or detect the signal strength at the access point 12 in two different bands. For example, a first band may be in the ISM (2.4 GHz) band and a second band may be in the UNII (5.2 GHz) band. By measuring the signal strength in two different bands, it is possible to compensate for propagation losses in the signal strength due to sources of interference or obstruction such as blocking objects, for example walls, in the path. In this case, the access point 12 is operable to transmit the signal strength data obtained in two different bands with respect to neighbouring access points 12 to the topology generation device 20 to be used or processed in determining the positions of the access points 12 in the wireless network 12.

Mobile Device 16

As described hereinbefore, the mobile station or device 16 is operable to wirelessly connect to the wireless network 14 via one of the access points 12 and preferably the mobile network to communicate with the wider network. The components and operations of a mobile device for the purpose of communicating with the wider network are well known to persons skilled in the art and need not be described in any further details herein except as is relevant to the present invention.

According to the embodiment of FIG. 2, the mobile device 16 comprises at least one sensor or detector which is part of a sensor or detector system or a set of sensors or detectors 31. Individual sensors within the set of sensors 31 are operable to monitor, sense and gather or measure sensor data or information associated with or relating to characteristics, properties and parameters of the system 30, the surrounding environment, or elements or devices associated therewith or coupled thereto. For example, the set of sensors 31 is operable to sense and gather sensor data relating to a state of the mobile device 16 and/or a state of the environment surrounding the mobile device 16. The state of the mobile device 16 comprises a position of the mobile device 16. In an embodiment, the state of the mobile device 16 further comprises a velocity and/or speed of the mobile device 16. The state of the environment surrounding the mobile device 16 comprises at least one and more preferably a plurality of signal strengths sensed or measured at the mobile device 16 with respect to one or more access points 12. The set of sensors 30 comprises a signal strength sensor 32, an inertial sensor system 36 comprising an acceleration sensor 38 and an orientation sensor 40, a direction sensor 42 and a position sensor 44. Alternative embodiments of the invention may comprise additional or alternative sensors.

The signal strength sensor 32 is operable to measure a signal strength at the mobile device 16 with respect to one or more access points 12 and generate one or more signal strength indicators preferably in the form of RSSI data. The acceleration sensor 34 is operable to measure an acceleration of the mobile device 16 and produce an acceleration data. For example, the acceleration sensor 34 may be an accelerometer. The direction sensor 36 is operable to determine a direction relative to the Earth's magnetic poles and produce a direction data. For example, the direction sensor 36 may be an electronic compass. The position sensor 42 is operable to determine a position of the mobile device 16 and produce a position data. For example, the position sensor 42 may be a Global Positioning System ("GPS"). The orientation sensor 44 is operable to measure a rate of change of the orientation (i.e., angular rate) of the mobile device 16 and produce an orientation data. For example, the orientation sensor 44 may be a gyroscope.

The mobile device 16 comprising one or more of the above-described set of sensors 31 may be any one of those commercially available. For example, a smartphone such as that marketed under the trademark iPhone 4® by Apple Inc. Alternatively, the mobile device 16 may be operably coupled to one or more of the above-described set of sensors 31.

The mobile device 16 further comprises a storage medium or means 46, such as a memory device, for storing a program or software 48 comprising executable instructions, and a controller comprising a processor or processing means 50 operable, under the control of the program 48, to perform operations or functions as described below. The storage medium 46 can be of any type as long as it is capable of storing data or information (temporarily and/or permanently).

For example, the storage medium 46 can include volatile memory elements (e.g., random access memory ("RAM")) or non-volatile memory elements (e.g., read only memory ("ROM")), or a combination thereof. It should be appreciated that the program 48 (or parts thereof) need not be stored in the storage medium 46 of the mobile device 16 and can instead be located in a storage medium remote from but accessible by the mobile device 16.

The processor 50 can be of any type as long as it is capable of processing/executing instructions and/or managing the flow of data and information through the mobile device 16. For example, the processor 50 can be any custom made or commercially available processor, a central processing unit ("CPU"), a data signal processor ("DSP"), a processing circuit or an auxiliary processor among several processors associated with the mobile device 16. The processor 50 may be a semiconductor based processor (in the form of a microchip) or a macroprocessor, for example. The interconnections between the processor 50 and other components of the mobile device 16, such as the storage medium 46 and the set of sensors 31, are not shown in FIG. 2 as interconnecting such components is known to persons skilled in the art and need not be described herein or illustrated in the figures.

As an illustrative example shown in FIG. 1, the mobile device 16, under the control of the program 48, is operable to measure a signal strength with respect to three neighbouring access points 12 indicated by the dashed lines upon receiving an instruction or a request, and is operable to generate one or more signal strength indicators (one signal strength indicator for each neighbouring access point 12 in the embodiment). Preferably, the signal strength indicator is in the form of Radio Signal Strength Indication ("RSSI") data. For example, the request may be issued by the topology generation device 20, transmitted to the mobile device 16 and executed by the program 48 of the mobile device 16.

Once the signal strength data with respect to neighbouring access points 12 is obtained, the mobile device 16 is operable to transmit the signal strength data to the topology generation device 20 to be used or processed in augmenting the estimated positions of the access points 12 based on the access point signal strength data. The signal strength data obtained and transmitted by the mobile device 16 can hereinafter be used, or referred to, interchangeably as "mobile device signal strength data".

In an embodiment, the mobile device 16 is operable, under the control of the program 48, to determine its position estimate to an absolute reference frame (or absolute position estimate) based on the set of sensors 31. In one embodiment, the absolute position estimate is determined using an approach or process known in the art as Dead Reckoning ("DR"). In another embodiment, the position of the mobile device 16 is estimated using the DR approach is refined so as to obtain an improved or more accurate position estimate of location of the mobile device 16 in real time.

A system and method for determining both the above-mentioned position estimates of a mobile device or mobile station have already been described in detail by the Applicant in Australian Provisional Patent Application No. 2011901585 filed 29 Apr. 2011, and International Patent Application No. PCT/AU2012/000438 filed 27 Apr. 2012 claiming priority therefrom, the disclosures of which are expressly incorporated herein in their entirety by reference, which means that they should be read and considered by the reader as part of this text and are not repeated in this text merely for reasons of conciseness.

Once a position estimate of the mobile device 16 is determined, the position estimate of the mobile device 16 is transmitted to the topology generation device 20 to be used in determining or referencing the positions of the access points 12 with respect to an absolute reference frame. The position estimate determined and transmitted by the mobile device 16 can hereinafter be used interchangeably as "mobile device position data".

Topology Generation Device 20

The topology generation device 20 is operable for automatically determining the access point topology of the multi-cell wireless communication network 14. The main components of the device 20 and the functions thereof according to an embodiment are described below with reference to FIG. 2.

The topology generation device 20 comprises a storage medium or means 52, such as a memory device, for storing a program or software 54 comprising executable instructions, and controller comprising a processor or processing means 56 operable, under the control of the program 54, to perform the functions of the topology generation device 20 as are described below. The storage medium 52 can be of any type as long as it is capable of storing data or information (temporarily and/or permanently).

For example, the storage medium 52 can include volatile memory elements (e.g., random access memory ("RAM")) or non-volatile memory elements (e.g., read only memory ("ROM")), or a combination thereof. It should be appreciated that the program 54 (or parts thereof) need not be stored in the storage medium 52 of the topology generation device 20 and can instead be located in a storage medium remote from but accessible by the topology generation device 20.

The processor 56 can be of any type as long as it is capable of processing/executing instructions and/or managing the flow of data and information through the topology generation device 20. For example, the processor 56 can be any custom made or commercially available processor, a central processing unit ("CPU"), a data signal processor ("DSP"), a processing circuit or an auxiliary processor among several processors associated with the topology generation device 20. The processor 50 may be a semiconductor based processor (in the form of a microchip) or a macroprocessor, for example. The interconnections between the processor 56 and other components of the topology generation device 20, such as the storage medium 52 and input/output interface(s) (not shown), are not shown in FIG. 2 as interconnecting such components is known to persons skilled in the art and need not be described herein or illustrated in the figures.

The program 54 can be functionally categorised into a plurality of modules or means comprising an access point data acquisition module 58, a mobile device data acquisition module 60, an access point position estimation module 62, and a filter module 64. However, it should be appreciated that the program need not be functionally categorised into modules or in such a manner and modifications and variations such as would be apparent to the person skilled in the art are deemed to be within the scope of the present invention.

Access Point Data Acquisition Module or Means 58

The access point data acquisition module 58 comprises one or more executable instructions and is operable, when executed by the processor 56, to perform the functions described below.

The access point data acquisition module 58 is operable to send a request or instruction for the access points 12 forming the wireless network 14 to measure a signal strength with respect to neighbouring access points 12 and to generate one or more signal strength indicators (one for each neighbouring access point in the embodiment) preferably in the form of RSSI data. In the embodiment where the communication system 10 comprises a network management system 19 as described hereinbefore, the access point data acquisition module 58 is operable to send such a request to the network management system 19. Upon receiving the request, the network management system 19 is operable to issue a request to the access points 12 in the wireless network under the control of the SNMP.

Once the signal strength data with respect to neighbouring access points 12 is obtained, the access point 12 is operable to transmit the signal strength data (or access point signal strength data) to the topology generation device 20.

The access point data acquisition module 58 is operable to receive the access point signal strength data.

As described hereinbefore, according to an embodiment, the access point 12 has a dual band capability operable to measure or detect the signal strength at the access point 12 in two different bands. Accordingly, in such an embodiment, the access point data acquisition module 58 is operable to receive access point signal strength data obtained in two different bands. In this case, the access point data acquisition module 58 is operable to correct the signal strength data to compensate for path losses (such as due to an obstructing wall in the path), based on deviations, if any, determined from the following Free-Space Path Loss ("FSPL") equation:

$$FSPL = \left(\frac{4\pi d}{\lambda}\right)^2$$
$$= \left(\frac{4\pi df}{c}\right)^2$$

where:
$\lambda$ is the signal wavelength (in meters),
f is the signal frequency (in hertz),
d is the distance from the transmitter (in meters),
c is the speed of light in a vacuum, $2.99792458 \times 10^8$ meters per second.

As an illustrative example, when comparing the FSPL at 2.45 GHz (mid band) to 5.2 GHz (mid-band), there is a constant difference of about 6.5 dB. Since 5 GHz radiation is generally absorbed to a greater extent than 2.4 GHz radiation, any positive deviations from the 6.5 dB free-space constant difference ("normal difference") can imply the existence of a source of interference or obstruction, including, for example, blocking objects in the path such as an obstructing wall. Accordingly, such deviation information can be used to apply a correction factor to the signal strength data obtained so as to compensate for the additional path losses due to the source of interference or obstruction, for example, blocking objects in the path.

Once the access point signal strength data has been received or when the access point signal strength data received has been corrected, the access point data acquisition module 58 is operable to process or convert the received (and preferably corrected) access point signal strength data into relative distance estimates for each signal strength measured with respect to each neighbouring access point 12. In an embodiment, the distance estimates are then input or recorded into a similarity (or diagonal) matrix or a distance matrix or database. In a preferred embodiment, the relative distance estimates are input into a Torgerson-SMACOF similarity matrix.

In an embodiment, the relative distance estimate of an access point 12 with respect to a neighbouring access point is determined based on the following formula:

Distance Estimate$(i,j) = f(\text{SignalStrength}(i,j))$, where SignalStrength$(i,j)$ represents the signal strength or power level received by access point $(i)$ from access point $(j)$; and f is a function for correcting the signal strength data to compensate for path losses due to at least one source of interference or obstruction as described hereinbefore and then applying an inverse path loss formula to derive the distance estimate.

The access point data acquisition module 58 is then operable to send the relative distance estimates or the matrix comprising the relative distance estimates to the access point position estimation module 62 to be used or processed in determining the access point topology of the wireless network 14.

The signal strength measured or detected at an access point 12 or a mobile device 16 will provide an indication of the distance of the access point 12 or a mobile device 16 from its neighbouring access points 12. For example, the poorer the quality of the signal strength measured, the larger the distance between them and vice versa.

Mobile Device Data Acquisition Module or Means 60

The mobile device data acquisition module 60 comprises one or more executable instructions and is operable, when executed by the processor 56, to perform the functions described below.

The mobile device data acquisition module 60 is operable to send a request or instruction for the mobile device 16 to measure a signal strength with respect to neighbouring access points 12 and to generate one or more signal strength indicators (one for each neighbouring access point 12 in the embodiment) preferably in the form of RSSI data.

Upon receiving the request, the mobile device 16 is operable to, under the control of the program 48, measure a signal strength at the mobile device 16 with respect to neighbouring access points 12 and generate signal strength indicators (one for each neighbouring access point 12 in the embodiment).

Once the signal strength data with respect to neighbouring access points 12 is obtained, the mobile device 16 is operable to transmit the signal strength data (or mobile device signal strength data) to the topology generation device 20.

The mobile device data acquisition module 60 is operable to receive the mobile device signal strength data. Once the mobile device signal strength data has been received, the mobile device data acquisition module 60 is operable to process or convert the received mobile device signal strength data into relative distance estimates for each signal strength measured with respect to each neighbouring access points 12.

As described hereinbefore, according to an embodiment, the mobile device 16 is operable, under the control of the program 48, to determine its absolute position estimate based on operation of the set of sensors 31. In such an embodiment, the mobile device data acquisition module 60 is operable to receive the absolute position estimate of the mobile device 16 and then determine or reference (or "pin") the relative distance estimates obtained with respect to an absolute reference frame.

In an embodiment, the relative distance estimates or the referenced distance estimates are then inputted or recorded into a similarity (or diagonal) matrix or a distance matrix or database. In a preferred embodiment, the relative distance estimates are input into a Torgerson-SMACOF similarity matrix.

The mobile device data acquisition module 60 is then operable to send the distance estimates or the matrix comprising the distance estimates to the access point position estimation module 62 to be used in augmenting the position estimate of the access points 12 estimated based on the access point signal strength data.

As the mobile device 16 is normally moved around various locations by a person carrying the mobile device 16, the signal strength data collected by the mobile device 16 (and thus the distance estimates) is time-varying. In an embodiment, the mobile device 16 is operable to automatically periodically measure the signal strength with respect to neighbouring access points 12 and transmit the corresponding distance estimates to the topology generation device 20.

Access Point Position Estimation Module or Means 62

The access point position estimation module 62 comprises one or more executable instructions and is operable, when executed by the processor 56, to perform the functions described below.

The access point position estimation module 62 is operable to receive the distance estimates from the access point data acquisition module 58 and to process the distance estimates using an algorithm suitable for determining or estimating the positions of the access points 12 based on distance estimates. In an embodiment, the distance estimates from the access point data acquisition module 58 are processed using a Torgerson-SMACOF algorithm to determine or estimate the positions of the access points 12 in the wireless network 14. The Torgeson-SMACOF algorithm is well known to persons skilled in the art and need not be described in any further detail herein except as is relevant to the present invention. For example, SMACOF is an iterative algorithm used in multi-dimensional scaling ("MDS") and Torgerson provides a starting configuration as input to SMACOF.

In an embodiment, a constrained Torgerson-SMACOF algorithm is used to estimate the positions of the access points 12 in the wireless network 14 which organises or arranges the estimated positions of the access points 12 into multiple floor levels or segments and into the respective estimated positions on each floor level. This is achieved by modifying the Torgeson-SMACOF algorithm to use three principal axes, rather than two principal axes, in order to allow for constrained estimation of the positions of the access points 12 on multiple floor levels in the wireless network 14. Such an access point topology of the wireless network 14 generated can be referred to as a first or baseline geospatial data. Accordingly, embodiments of the invention are operable to generate two dimensional (2D) three dimensional (3D) topologies.

As described hereinbefore, the mobile device is operable to measure a signal strength with respect to neighbouring access points 12. In an embodiment of the present invention, the access point position estimation module 62 is operable to augment or refine the estimated positions of the access points 12 estimated based on the distance estimates from the access point data acquisition module 58 (i.e., the first or baseline geospatial data). In the embodiment, the distance estimates from the access point data acquisition module 58 and the distance estimates from the mobile device data acquisition module 60 are combined into a matrix or database suitable as input for processing using an algorithm suitable for determining or estimating the positions of the access points 12 based on distance estimates. In an embodiment, the distance estimates from the access point data acquisition module 58 and the distance estimates from the mobile device data acquisition module 60 are combined into a hollow symmetric distance matrix for processing using a Torgerson-SMACOF algorithm to determine or estimate the positions of the access points 12 in the wireless network 14. In this case, the algorithm can be referred to as an augmented Torgerson-SMACOF algorithm.

The Torgerson-SMACOF algorithm allows a weighting of distance estimates for example to compensate for lack of readings between particular access point pairs (i, j). For example, two access points may be too far away to detect or sense each other. However, despite missing readings between particular access point pairs (i.e., the distance matrix is partially populated), the Torgerson-SMACOF algorithm will still be capable of satisfactorily estimating the positions of the access points 12 in the wireless network 14.

For example, since the mobile device 16 is normally moved around various locations by a person carrying the mobile device 16, the signal strength collected by the mobile device 16 (and thus the distance estimates) is time-varying. Therefore, preferably, the mobile device 16 is operable to periodically measure the signal strength with respect to neighbouring access points 12 and transmit the mobile device signal strength data to the topology generation device 20. In this case, the access point position estimation module 62 is operable to receive mobile device signal strength data periodically from the mobile device 16 and augment or refine the estimated positions of the access point 12 estimated based on the access point signal strength data.

For example, in the augmented Torgerson-SMACOF algorithm, successive distance estimates based on the mobile device signal strength data are individually incorporated into the Torgerson-SMACOF diagonal or similarity matrix as an additional column and row, increasing the Rank of the matrix by 1.

The augmented Torgerson-SMACOF is then run a number of times using successive distance estimates based on the mobile device signal strength data to derive a number of quasi-independent position estimates for the access points 12 in the wireless network 14.

The access point position estimation module 62 is operable to send the estimated positions of the access points 12 estimated based on the access point signal strength data, and periodically the refined or improved positions of the access points 12 augmented by the mobile device signal strength data to the filter module 64 as described below.

In an embodiment, the estimated positions of the access points 12 are processed so as to be oriented to a particular orientation in the three-dimensional space (e.g., a true North or South orientation or axis). In an embodiment, the estimated positions are oriented based on a position data obtained from the position sensor 42 of the mobile device 16. For example, in the case where the position sensor 42 is a GPS sensor, the position data can be a coarse GPS position data. As a result, the process yields estimated positions of the access points 12 with an absolute orientation with reference to an earth reference coordinate frame.

Filter Module or Means 64

The filter module 64 comprises one or more executable instructions and is operable, when executed by the processor 56, to perform the following functions.

The filter module 64 is operable to receive the estimated positions of the access points 12 from the access point position estimation module 62 and to filter the estimated positions to reduce or remove spurious or noisy position estimates.

In an embodiment, a Kalman filter is used to filter the estimated positions so as to derive final position estimates of the access points 12 in the wireless network 14. The Kalman filter is operable to refine (e.g., "clean" and/or stabilise) the position estimates by weighting the position estimates according to their covariance. That is, the Kalman filter is operable to refine the position estimates by weighting more heavily those position estimates that agree with each other and rejecting those position estimates that have a high variance against the other position estimates.

Figure 3:
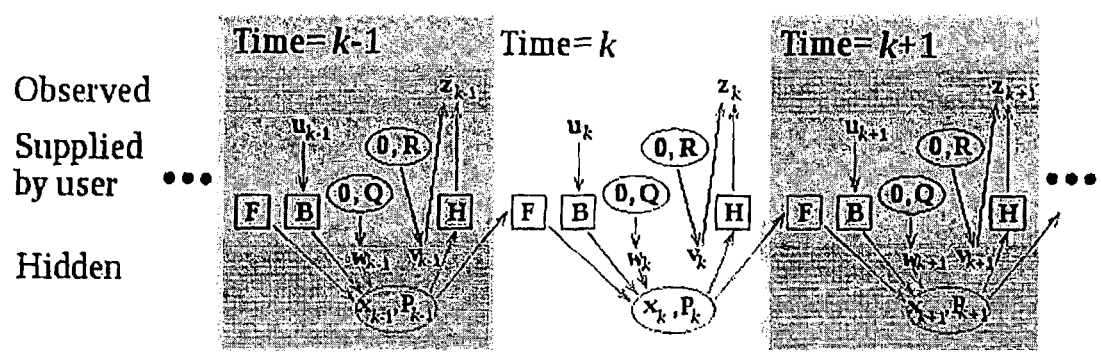
FIG. 3 depicts an exemplary filter model for refining a position estimate of a mobile device according to an embodiment of the present invention.

By way of example and without limitation, an exemplary Kalman filter model is illustrated in FIG. 3.

Once the filtered position estimates of the access points are obtained, the filter module 64 is operable to send them to the network management system as geospatial data for automatically configuration the GIS database.

Therefore, the method and system 30 according to the embodiment minimise or eliminate the need to manually determine and enter the geospatial data in a network management system. As a result of this automation, the time and costs associated with installing or configuring the geospatial database in a network management system required for various purposes, such as handover operations, can be reduced, whilst the reliability of such installation or configuration can be improved.

In addition, geospatial data is also typically required when installing a FMC system or deploying FMC solutions to existing communication systems. Therefore, being able to automatically configure the GIS database would significantly reduce a workload by a person installing the FMC solutions, thereby greatly reducing the time and costs to install FMC solutions.

The content and subject matter of Australian Provisional Patent Application 2011902814 titled "Method and Device for Configuring a Communication System" filed on 14 Jul. 2011 and the International Patent Application claiming priority therefrom filed by the Applicant on the same day as the present International Patent Application are expressly incorporated herein in their entirety by reference, which means that they should be read and considered by the reader as part of this text and are not repeated in this text merely for reasons of conciseness. The inventions the subject of the applications may be used together or combined in embodiments relating to FMC to allow for FMC solutions to be installed or deployed with reduced or minimum manual configuration, thereby moving towards zero human intervention.

According to an embodiment of the present invention, the program 54 is developed using a CentOS Virtual Machine platform targeting the Cisco Unified Communications Manager ("CUCM") based IP PBX environment.

In another embodiment of the present invention, there is provided a computer program product comprising computer-executable instructions adapted to cause, when executed by a data processing system (or a processing circuit), the data processing system (or the processing circuit) to perform the method or operations as hereinbefore described with respect to computer program 54. By way of example and without limitations, the computer program product may be embodied as a computer-readable medium having stored thereon the computer-executable instructions. For example, the computer-readable medium may be an optical disc, such as a Compact Disc ("CD"), a Digital Versatile Disc ("DVD") or a Blu-Ray Disc ("BD"), a diskette, a magnetic storage medium, a memory stick, or the like. Similarly, there is also provided a computer program product comprising computer-executable instructions adapted to cause, when executed by a data processing system (or a processing circuit), the data processing system (or the processing circuit) to perform the method or operations as hereinbefore described with respect to computer program 48.

In a further embodiment of the present invention, there is provided a trigger means (not shown) for restarting the system 30 or the method for determining or generating a topology of a wireless network 14 (i.e., re-determining, recalculating or regenerating the topology of the wireless network 14). For example, the trigger means may send a trigger signal to recalculate the topology of the wireless network 14 when one or more events occur, such as, for example, when physical changes in the wireless network 14 are detected by an appropriate sensor or otherwise indicated. For example, the physical changes can include the installation of one or more new access points, the relocation of one or more access points, and/or installation of new structures (e.g., new wall partitions). As an example, the relocation of one or more access points or the installation of new structures can be detected based on changes to the signal strength data detected at the one or more access points.

It will be appreciated by those skilled in the art that modifications and variations to the invention described herein will be apparent departing from the spirit and scope thereof. The variations and modifications as would be apparent to persons skilled in the art are deemed to fall within the broad scope and ambit of the invention as herein set forth.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

Additionally, throughout the specification, unless the context requires otherwise, the words "substantially" or "about" will be understood to not be limited to the value for the range qualified by the terms.

Where the words "store", "hold" and "save" or similar words are used in the context of the present invention, they are to be understood as including reference to the retaining or holding of data or information both permanently and/or temporarily in a storage means, device or medium for later retrieval, and momentarily or instantaneously, for example as part of a processing operation being performed.

Additionally, where the terms "system" and "device" are used in the context of the present invention, they are to be understood as including reference to any group of functionally related or interacting, interrelated, interdependent or associated components or elements that may be located in proximity to, separate from, integrated with, or discrete from, each other.

Additionally, in embodiments of the invention, the word "determining" is understood to include receiving or accessing the relevant data or information.

The invention claimed is:

1. A method for determining a topology of a wireless communication network, the method comprising:
   receiving, by a topology generating device from a plurality of fixed stations, a plurality of signal strength data respectively measured at the plurality of fixed stations in the network each with respect to its neighbouring fixed stations;
   receiving, by the topology generating device, sensor data measured at a mobile station operable to communicate with the network, wherein the sensor data comprises signal strength data measured at the mobile station and at least one of an acceleration data, an orientation data, a direction data, and a mobile station position data;
   determining, by the topology generating device, positions of the plurality of fixed stations based on the signal strength data measured at the plurality of fixed stations and the sensor data measured at the mobile station; and
   determining the topology by estimating at least one of a distance and a direction, using the at least one of acceleration data, orientation data, direction data, and mobile station position data, between two or more locations of the mobile station at which signal strength data has been measured, to reference the positions of the plurality of fixed stations with respect to an absolute reference frame.

2. The method according to claim 1, wherein the topology comprises at least one of a physical arrangement, a two dimensional (2D) topology, a three dimensional (3D) topology, and a logical topology.

3. The method according to claim 2, wherein the physical arrangement comprises data of the positions of one or more fixed stations of the plurality of fixed stations and optionally the mobile station.

4. The method according to claim 3, wherein the data comprises an estimate of distance between at least two of the fixed stations, and optionally between the mobile station and at least one of the fixed stations.

5. The method according to claim 4, wherein the distance estimate of a fixed station with respect to a neighbouring fixed station is determined based on the following formula:

Distance Estimate $(i,j)=f$(SignalStrength $(i,j)$), where SignalStrength (i, j) represents the signal strength or power level received by fixed station (i) from fixed station (j); and
$f$ is a function for correcting the signal strength data to compensate for at least one source of interference or obstruction and then applying an inverse path loss formula to derive the distance estimate.

6. The method according to claim 4 or 5, comprising storing the distance estimate in a storage means.

7. The method according to claim 6, wherein the storage means comprises at least one of a similarity matrix, a diagonal matrix, a database, and a pre-SMACOF similarity matrix.

8. The method according to claim 4, wherein determining the topology comprises processing the distance estimates using an algorithm suitable for determining or estimating the positions of the fixed stations based on distance estimates.

9. The method according to claim 8, wherein the processing comprises using a Torgerson-SMACOF algorithm and/or using a constrained Torgerson-SMACOF algorithm to estimate the positions of the fixed stations in the network and arrange the estimated positions of the fixed stations into multiple floor levels or segments of a physical environment of the network and into the respective estimated positions on each floor level or segment.

10. The method according to claim 9, comprising filtering the estimated positions.

11. The method according to claim 1, comprising automatically determining the topology.

12. The method according to claim 1, comprising measuring the signal strength data in more than one frequency or frequency bands.

13. The method according to claim 12, comprising measuring the signal strength data in two frequencies or frequency bands.

14. The method according to claim 1, comprising correcting received signal strength data to compensate for at least one source of interference or obstruction.

15. The method according to claim 1, wherein the sensor data relates to a state of the mobile station or a state of the environment surrounding the mobile station.

16. The method according to claim 15, wherein the state of the mobile station comprises at least one of a position, a velocity, and a speed of the mobile station.

17. The method according to claim 15 or 16, wherein the state of the environment surrounding the mobile station comprises a plurality of signal strengths sensed or measured.

18. The method according to claim 1, wherein the signal strength data comprises Radio Signal Strength Indication ("RSSI") data.

19. The method according to claim 18, wherein the RSSI is generated by a radio signal strength sensor.

20. The method according to claim 1, comprising requesting the measurement of the signal strength data.

21. The method according to claim 1, comprising redetermining the topology of the network upon the occurrence of one or more events.

22. A non-transitory computer-readable medium on which is stored instructions that, when executed by a computing means, causes the computing means to carry out the method according to claim 1.

23. A data signal including at least one instruction being capable of being received and interpreted by a computing system, wherein the instruction implements the method according to claim 1.

24. A device for determining a topology of a wireless communication network, the device comprising a processor and a non-transitory storage medium, the non-transitory storage medium having a computer program comprising executable instructions stored thereon, whereby the processor is operable, under control of the computer program, to:
   receive a plurality of signal strength data respectively measured at a plurality of fixed stations in the network each with respect to its neighbouring fixed stations,
   receive sensor data measured at a mobile station operable to communicate with the network, wherein the sensor data comprises signal strength data measured at the mobile station and at least one of an acceleration data, an orientation data, a direction data, and a mobile station position data;
   determine positions of the plurality of fixed stations based on the signal strength data measured at the plurality of fixed stations and the sensor data measured at the mobile station; and
   determine the topology by estimating at least one of a distance and a direction, using the at least one acceleration data, orientation data, direction data, and mobile station position data, between two or more locations of the mobile station at which signal strength data has been measured, to reference the positions of the plurality of fixed stations with respect to an absolute reference frame.

25. The device according to claim 24, wherein the topology comprises at least one of a physical arrangement, a two dimensional (2D) topology, a three dimensional (3D) topology, and a logical topology.

26. The device according to claim 25, wherein the physical arrangement comprises data of the positions of the plurality of fixed stations and optionally the mobile station.

27. The device according to claim 26, wherein the data comprises an estimate of distance between at least two of the fixed stations, and optionally between the mobile station and at least one of the fixed stations.

28. The device according to claim 27, wherein the processor is operable, under control of the computer program, to determine the distance estimate of a fixed station with respect to a neighbouring fixed station based on the following formula:

Distance Estimate $(i,j)=f(\text{SignalStrength }(i,j))$, where SignalStrength (i, j) represents the signal strength or power level received by fixed station (i) from fixed station (j); and $f$ is a function for correcting the signal strength data to compensate for at least one source of interference or obstruction and then applying an inverse path loss formula to derive the distance estimate.

29. The device according to claim 27 or 28, wherein the processor is operable, under control of the computer program, to store the distance estimate in a storage means.

30. The device according to claim 29, wherein the storage means comprises at least one of a similarity matrix, a diagonal matrix, a database, and a pre-SMACOF similarity matrix.

31. The device according to claim 27, wherein the processor is operable, under control of the computer program, to determine the topology by processing the distance estimates using an algorithm suitable for determining or estimating the positions of the fixed stations based on distance estimates.

32. The device according to claim 31, wherein the processing comprises using a Torgerson-SMACOF algorithm and/or using a constrained Torgerson-SMACOF algorithm to estimate the positions of the fixed stations in the network and arrange the estimated positions of the fixed stations into multiple floor levels or segments of a physical environment of the network and into the respective estimated positions on each floor level or segment.

33. The device according to claim 32, wherein the processor is operable, under control of the computer program to filter the estimated positions.

34. The device according to claim 24, wherein the processor is operable, under control of the computer program, to automatically determine the topology.

35. The device according to claim 24, wherein the processor is operable, under control of the computer program, to receive signal strength data measured in more than one frequency or frequency bands.

36. The device according to claim 35, wherein the signal strength data is measured in two frequencies or frequency bands.

37. The device according to claim 24, wherein the processor is operable, under control of the computer program, to correct received signal strength data to compensate for at least one source of interference or obstruction.

38. The device according to claim 24, wherein the sensor data relates to a state of the mobile station or a state of the environment surrounding the mobile station.

39. The device according to claim 38, wherein the state of the mobile station comprises at least one of a position, a velocity, and a speed of the mobile station.

40. The device according to claim 38 or 39, wherein the state of the environment surrounding the mobile station comprises a plurality of signal strengths sensed or measured.

41. The device according to claim 24, wherein the signal strength data comprises Radio Signal Strength Indication ("RSSI") data.

42. The device according to claim 41, wherein the RSSI is generated by a radio signal strength sensor.

43. The device according to claim 24, wherein the processor is operable, under control of the computer program, to request the measurement of the signal strength data.

44. The device according to claim 24, wherein the processor is operable, under control of the computer program, to redetermine the topology of the network upon the occurrence of one or more events.

* * * * *